United States Patent
Davis

(10) Patent No.: US 10,339,118 B1
(45) Date of Patent: *Jul. 2, 2019

(54) DATA NORMALIZATION SYSTEM

(71) Applicant: Palantir Technologies Inc., Palo Alto, CA (US)

(72) Inventor: Luke Davis, Winchcombe (GB)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,993

(22) Filed: Aug. 11, 2017

Related U.S. Application Data

(63) Continuation of application No. 15/391,728, filed on Dec. 27, 2016, now Pat. No. 9,805,073.

(51) Int. Cl.
| | |
|---|---|
| *G06F 16/00* | (2019.01) |
| *G06F 16/215* | (2019.01) |
| *G06F 7/02* | (2006.01) |
| *G06F 16/2458* | (2019.01) |

(Continued)

(52) U.S. Cl.
CPC ............ *G06F 16/215* (2019.01); *G06F 7/02* (2013.01); *G06F 16/2468* (2019.01); *G06F 16/2471* (2019.01); *G06F 16/3329* (2019.01); *G06F 16/3343* (2019.01); *G06F 16/3344* (2019.01); *G06F 16/3346* (2019.01)

(58) Field of Classification Search
CPC .... G06F 16/3331; G06F 16/245; G06F 16/31; G06F 16/22; G06F 16/24578; G06F 16/00; G06F 16/907; G06F 16/90335; G06F 17/289; G06F 17/30746; G06F 17/30864; G06F 17/3053; G06F 17/2854; G06F 17/30669; G06F 17/30681; G06F 17/30778; G06F 17/30654; G06F 17/30657; G06F 17/30613; G06F 17/30985
USPC ................................................. 707/705–780
See application file for complete search history.

(56) References Cited

U.S. PATENT DOCUMENTS

| | | | | |
|---|---|---|---|---|
| 6,018,736 | A * | 1/2000 | Gilai | .......... G06F 17/30654 |
| 8,645,417 | B2 * | 2/2014 | Groeneveld | ...... G06F 17/30657 707/758 |
| 8,706,723 | B2 | 4/2014 | Huenemann et al. | |

(Continued)

OTHER PUBLICATIONS

"U.S. Appl. No. 15/391,728, Notice of Allowance dated Jun. 28, 2017", 7 pgs.

(Continued)

*Primary Examiner* — Michelle N Owyang
(74) *Attorney, Agent, or Firm* — Shwegman Lundberg & Woessner, P.A.

(57) ABSTRACT

A data normalization system receives a first string and a second string that are ordered according to an initial string ordering. The data normalization system analyzes, the first string and the second string based on a list of known character sets included in surnames, yielding an analysis, and determines, based on the analysis, that a set of characters in the second string matches a known character set included in the list of known character sets included in surnames. In response to determining that the set of characters in the second string matches a known character set included in the list of known character sets included in surname, the data normalization system orders the first string and the second string according to an updated string ordering.

17 Claims, 6 Drawing Sheets

(51) Int. Cl.
*G06F 16/332* (2019.01)
*G06F 16/33* (2019.01)

(56) References Cited

U.S. PATENT DOCUMENTS

| | | |
|---|---|---|
| 9,129,046 B2 | 9/2015 | Bess |
| 9,275,339 B2 | 3/2016 | Culbertson et al. |
| 9,805,073 B1 | 10/2017 | Davis |
| 2009/0271359 A1 | 10/2009 | Bayliss |
| 2010/0153396 A1 | 6/2010 | Margulies et al. |
| 2011/0106814 A1 | 5/2011 | Okato et al. |
| 2012/0330947 A1* | 12/2012 | Huenemann ...... G06F 17/30528 707/728 |
| 2013/0282645 A1* | 10/2013 | Culbertson ............ G06N 7/005 706/52 |
| 2014/0046921 A1 | 2/2014 | Bau |
| 2014/0244300 A1* | 8/2014 | Bess .................... G06F 19/322 705/3 |
| 2015/0112679 A1* | 4/2015 | Zhang .................. G10L 15/187 704/243 |
| 2015/0154381 A1* | 6/2015 | Stephenson ............. G06F 19/36 707/722 |
| 2017/0124216 A1 | 5/2017 | Miller et al. |

OTHER PUBLICATIONS

U.S. Appl. No. 15/391,728 U.S. Pat. No. 9,805,073, filed Dec. 27, 2016, Data Normalization System.

* cited by examiner

400 ⤹

```
┌─────────────────────────────────────────────┐
│ CONVERT, USING A METAPHONE ALGORITHM, A FIRST│
│ STRING INTO A FIRST METAPHONE STRING, AND A  │
│ SECOND STRING INTO A SECOND METAPHONE STRING │
│                    402                       │
└─────────────────────────────────────────────┘
                       │
                       ▼
┌─────────────────────────────────────────────┐
│ SEARCH, BASED ON THE FIRST METAPHONE STRING  │
│ AND THE SECOND METAPHONE STRING, A NAME      │
│ INDEX INCLUDING A LISTING OF METAPHONE       │
│ STRINGS REPRESENTING COMMON NAMES AND        │
│ PROBABILITIES THAT THE COMMON NAMES ARE      │
│ EITHER A GIVEN NAME OR A SURNAME             │
│                    404                       │
└─────────────────────────────────────────────┘
                       │
                       ▼
┌─────────────────────────────────────────────┐
│ DETERMINE A CONFIDENCE SCORE INDICATING A    │
│ CONFIDENCE LEVEL THAT THE FIRST STRING       │
│ REPRESENTS THE GIVEN NAME AND THE SECOND     │
│ STRING REPRESENTS THE SURNAME                │
│                    406                       │
└─────────────────────────────────────────────┘
                       │
                       ▼
┌─────────────────────────────────────────────┐
│ DETERMINE THAT THE CONFIDENCE SCORE MEETS OR │
│ EXCEEDS A THRESHOLD CONFIDENCE SCORE         │
│                    408                       │
└─────────────────────────────────────────────┘
```

*FIG. 4*

DATA NORMALIZATION SYSTEM

CROSS-REFERENCE TO RELATED APPLICATIONS

The present application is a continuation of and claims the benefit of priority of U.S. application Ser. No. 15/391,728, filed on Dec. 27, 2016, which is incorporated herein by reference in its entirety.

TECHNICAL FIELD

The present disclosure generally relates to the technical field of special-purpose machines that normalize data, including computerized variants of such special-purpose machines and improvements to such variants, and to the technologies by which such special-purpose machines become improved compared to other special-purpose machines that normalize data. In particular, the present disclosure addresses systems and methods for normalizing data including user names.

BACKGROUND

Integrating data files listing user names can lead to issues because the names can be listed in varying formats, include errors, or the data can be too messy to easily discern the user's given name and surname. For example, a record may incorrectly have a user's given name and surname swapped. As another example, a record may not be in a consistent format. As a result, duplicate records can be created for a single user and/or data can be missed.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 4 shows an example method for normalizing data that includes user names, according to some example embodiments.

DETAILED DESCRIPTION

Figure 1:
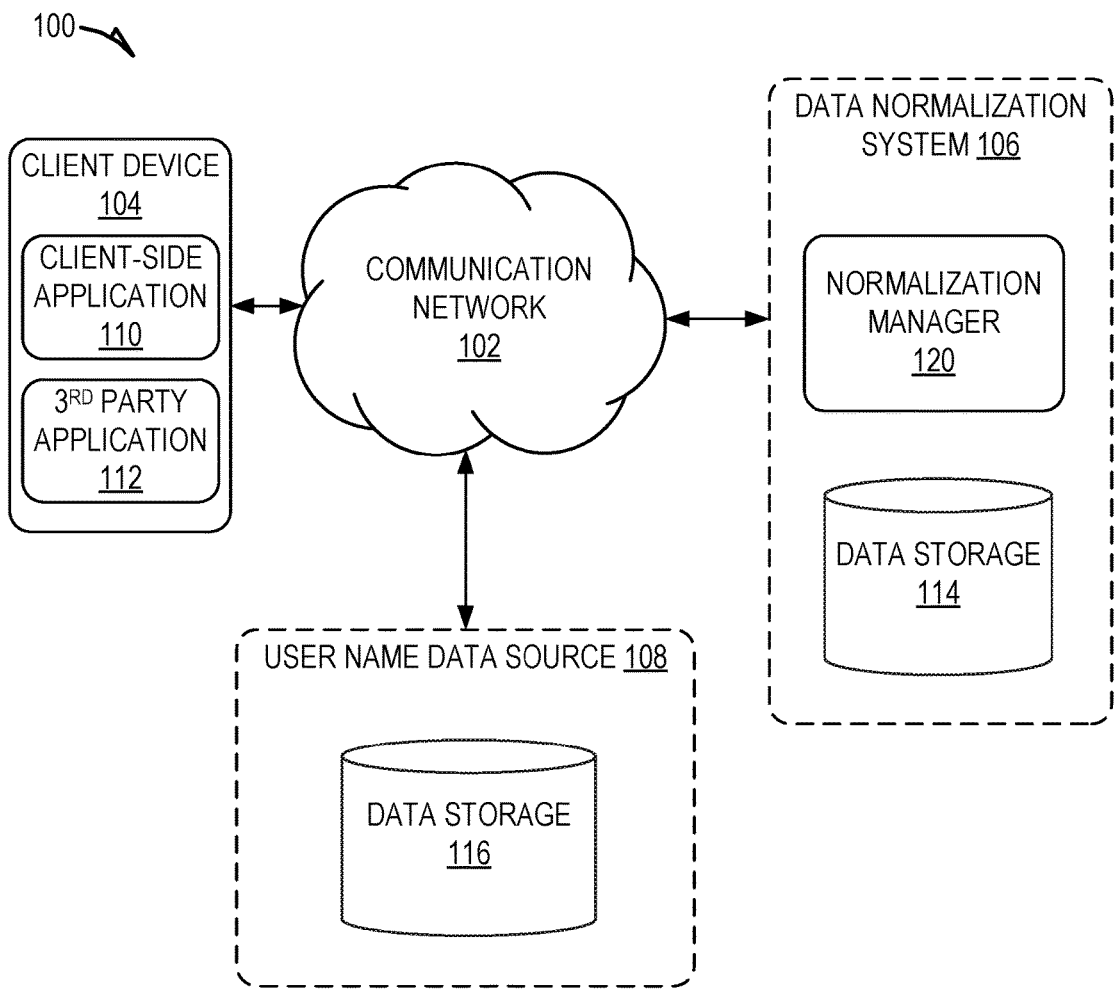
FIG. 1 shows an exemplary system for normalizing data that includes user names, according to some example embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed are systems, methods, and computer-readable storage media for normalizing data including user names. As discussed above, integrating data files listing user names can lead to issues because the names can be listed in varying formats, include errors, or the data can be too messy to easily discern the user's given name and surname. For example, a record may incorrectly have a user's given name and surname swapped. As another example, a record may not be in a consistent format. As a result, duplicate records can be created for a single user and/or data can be missed.

A data normalization system can normalize data including user names. A user name can be a person's full name, including the person's given name (e.g., first name) and the person's surname (e.g., last name). To avoid issues associated with variant spellings and/or misspellings of a given and/or surname, the data normalization system can utilize metaphone strings of the respective names. A metaphone string can be a phonetic spelling of a word. Accordingly, variant spellings and/or misspellings of a name can result in a consistent metaphone string.

The data normalization system can use a metaphone algorithm to convert the first string into a first metaphone string, and the second string into a second metaphone string. The data normalization system can search, based on the first metaphone string and the second metaphone string, a name index, which includes a listing of metaphone strings representing common names and probabilities that the common names are either a given name or a surname. The data normalization system can then determine, based on searching the name index, a confidence score indicating a confidence level that the first string represents the given name and the second string represents the surname.

The data normalization system can compare the confidence score to a threshold confidence score. If the data normalization system determines that the confidence score meets or exceeds a threshold confidence score, the data normalization system can determine that the first string represents the given name and the second string represents the surname. The data normalization system can then arrange the first string and the second string into a normalized format (e.g., 'surname, given name' or 'given name, surname').

In some embodiments, the data normalization system can determine whether a string includes a set of characters or patterns indicating that the string is a surname. Certain sets of characters, such as 'Van,' 'Bin,' 'Del,' etc., included in a string can indicate that the string is likely a surname rather than a given name. The data normalization system can determine that the string includes a set of characters indicating that the string is a surname by analyzing the string based on a list of known character or patterns sets commonly or exclusively included in surnames, and determining that the set of characters included in the string matches a known character set included in the list of known character sets or patterns commonly or exclusively included in surnames.

In some embodiments, the data normalization system can determine the confidence score based on whether a string includes a set of characters indicating that the string is the surname. For example, the data normalization system can assign a higher confidence score upon determining that a string includes a set of characters indicating that the string is a surname.

In some embodiments, the name index can include multiple sets of metaphone strings corresponding to different language sets. For example, the name index can include at least a first set of metaphone strings corresponding to a first language set, and a second set of metaphone strings corresponding to a second language set. The metaphone strings in each set of metaphone strings can represent phonetic pronunciations of names based on the corresponding language set. The data normalization system can search one or more of the multiple sets of metaphone strings.

In some embodiments, the threshold confidence score can be based on a reliability level of a data set including the first string and the second string. A data set that has a high reliability level (e.g., data set in a consistent format and/or clean data set) can be trusted more than a data set with a lower reliability level. Accordingly, a higher threshold confidence value can be used for a data set that has a high reliability level, thereby requiring a high level of confidence to rearrange the order of data included in the data set. Alternatively, a lower threshold confidence value can be used for a data set that has a low reliability level, thereby requiring a lower level of confidence to rearrange the order of the data included in the data set.

The output provided by the data normalization system can varied based on user preferences. For example, in instances where high accuracy is desired, the data normalization system can be configured to return null in response to determining that the confidence score does not meet a threshold confidence score. As a result, names that may be in an incorrect order will not be added to a resulting data set.

As another example, the data normalization system can be configured to not swap the names when the confidence score does not meet a threshold confidence score. This can be useful when it is important that every name be added to the resulting data set, and accepting that some names may be ordered incorrectly is acceptable. In this type of embodiment, the names are only swapped if the confidence score meets or exceeds the threshold confidence score. In the confidence score does not meet or exceed the threshold confidence score, the data normalization system keeps the names in their existing order.

FIG. 1 shows an exemplary system 100 for normalizing data that includes user names. While system 100 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of system 100 are discussed in a singular sense, multiple instances of one or more of the various functional components may be employed.

As shown, system 100 can include multiple computing devices connected to communication network 102 and configured to communicate with each other through use of communication network 102. Communication network 102 can be any type of network, including a local area network ("LAN"), such as an intranet, a wide area network ("WAN"), such as the internet, or any combination thereof. Further, communication network 102 can be a public network, a private network, or a combination thereof. Communication network 102 can also be implemented using any number of communication links associated with one or more service providers, including one or more wired communication links, one or more wireless communication links, or any combination thereof. Additionally, communication network 102 can be configured to support the transmission of data formatted using any number of protocols.

Multiple computing devices can be connected to communication network 102. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 600 of FIG. 6.

To facilitate communication with other computing devices, a computing device can include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As shown, system 100 can include client device 104, data normalization system 106 and user name data source 108. In system 100, a user can interact with data normalization system 106 through client device 104 connected to communication network 102 by direct and/or indirect communication. Client device 104 can be any of a variety of types of computing devices that include at least a display, a computer processor, and communication capabilities that provide access to communication network 102 (e.g., a smart phone, a tablet computer, a personal digital assistant (PDA), a personal navigation device (PND), a handheld computer, a desktop computer, a laptop or netbook, or a wearable computing device).

Data normalization system 106 can consist of one or more computing devices and support connections from a variety of different types of client devices 104, such as desktop computers; mobile computers; mobile communications devices (e.g. mobile phones, smart phones, tablets, etc.); smart televisions; set-top boxes; and/or any other network enabled computing devices. Client device 104 can be of varying type, capabilities, operating systems, etc. Furthermore, data normalization system 106 can concurrently accept connections from and interact with multiple client devices 104.

A user can interact with data normalization system 106 via client-side application 110 installed on client device 104. In some embodiments, client-side application 110 can include a data normalization system 106 specific component. For example, the component can be a stand-alone application, one or more application plug-ins, and/or a browser extension. However, the user can also interact with data normalization system 106 via third-party application 112, such as a web browser, that resides on client device 104 and is configured to communicate with data normalization system 106. In either case, client-side application 110 and/or third party application 112 can present a user interface (UI) for the user to interact with data normalization system 106.

Data normalization system 106 can include data storage 114 to store data. The stored data can include any type of data, such as digital data, documents, text files, audio files, video files, etc. Data storage 114 can be a storage device, multiple storage devices, or one or more servers. Alternatively, data storage 114 can be a cloud storage provider or network storage. Data normalization system 106 can store data in a network accessible storage (SAN) device, in a redundant array of inexpensive disks (RAID), etc. Data storage 114 can store data items using one or more partition types, such as FAT, FAT32, NTFS, EXT2, EXT3, EXT4, ReiserFS, BTRFS, and so forth.

Data normalization system 106 can include normalization manager 120 configured to normalize data including user names. A user name can be a person's full name, including the person's given name (e.g., first name) and the person's surname (e.g., last name). Data normalization system 106 can receive a data set including one or more user names from client device 104 and/or user name data source 108. For example, normalization manager 120 can provide client device 104 with a name normalization interface that allows a user to provide data normalization system 106 with a data set including one or more user names. For example, the name normalization interface can allow a user to enter names individually and/or upload the data set from client device 104.

Data normalization system 106 can also receive a data set from user name data source 108. User name data source 108 can be any type of data source that maintains data including user names. User name data source 108 includes data storage 116 that stores data sets of user names. Normalization manager 120 can communicate with user name data source 108 to gather a data set from data storage 116. Alternatively, user name data storage 108 can transmit a data set from data storage 116 to data normalization system 106. Although only a single user name data source 108 is shown, this is only for ease of explanation and is not meant to be limiting. Data normalization system 106 can receive data sets of user names from any number of user name data sources and this disclosure envisions all such possibilities.

Data sets received from user name data source 108 can include data sets that have not been normalized as well as normalized data sets that are used as training data for data normalization system 106. The normalized data sets can include known correct first and last names that can be used to analyze and normalized data sets that have not been normalized. Although system 100 is shown as including only a single user name data source 108, this is only for ease of explanation and is not meant to be limiting. System 100 can include any number of user name data sources 108, and this disclosure anticipates all such embodiments.

Normalization manager 120 can parse a received data set to identify user names. For example, normalization manager 120 can identify spaces, punctuation (e.g., commas, periods, etc.), line returns, etc., that indicate that a string represents a single user name. Normalization manager 120 can further parse each identified user name to remove superfluous characters and/or punctuation (e.g., name prefixes, name suffix, salutations, initials, punctuation, etc.), and identify a first string and a second string that represent a user's given name and surname. In the event of the presence of multiple candidate given names, normalization manager 120 can identify which given name is the first name based on location of the surname and probability of each candidate given name as a given name. Normalization manager 120 can analyze the first string and the second string to determine which string is the given name and which string is the surname.

To avoid issues associated with variant spellings and/or misspellings of a given and/or surname, normalization manager 120 can utilize metaphone strings of the respective names. A metaphone string can be a phonetic spelling of a word. Accordingly, variant spellings and/or misspellings of a name can result in a consistent metaphone string.

Normalization manager 120 can utilize a metaphone algorithm to convert the first string into a first metaphone string, and the second string into a second metaphone string. Normalization manager 120 can utilize any known metaphone algorithm, such as the double metaphone phonetic encoding algorithm, metaphone 3 phonetic encoding algorithm, etc.

Normalization manager 120 can search, based on the first metaphone string and the second metaphone string, a name index, which includes a listing of metaphone strings representing common names and probabilities that the common names are either a given name or a surname. The name index can be stored in data storage 114 and normalization manager 120 can communicate with data storage 120 to access and search the name index.

In some embodiments, the name index can include multiple sets of metaphone strings corresponding to different language sets, geographical regions, genders or other contextual information. For example, the name index can include at least a first set of metaphone strings corresponding to a first language set, and a second set of metaphone strings corresponding to a second language set. The metaphone strings in each set of metaphone strings can represent phonetic pronunciations of names based on the corresponding language set. Normalization manager 120 can search one or more sets of the metaphone strings, using contextual information where available to yield higher accuracy.

Normalization manager 120 can determine a confidence score indicating a confidence level that the first string represents the given name and the second string represents the surname. The confidence score can be based on the probabilities listed in the name index. For example, if the first metaphone string matches a metaphone string in the name index with a high probability of being a given name and the second metaphone string matches a metaphone string in the name index with a high probability of being a surname, normalization manager 120 can assign a high confidence score that the first string represents the given name and the second string represents the surname. Alternatively, if the first and/or second metaphone strings do not match any entries in the name listing or match listings assigned with lower probabilities of being a given name or surname, normalization manager 120 can assign a lower confidence score that the first string represents the given name and the second string represents the surname.

In some embodiments, normalization manager 120 can determine whether a string includes a set of characters indicating that the string is a surname. Certain sets of characters, such as 'Van,' 'Bin,' 'Del,' etc., included in a string can indicate that the string is likely a surname rather than a given name. Normalization manager 120 can determine that the string includes a set of characters indicating that the string is a surname by analyzing the string based on a list of known character sets or patterns commonly or exclusively included in surnames, and determining that the set of characters or patterns included in the string matches a known character set or pattern included in the list of known character sets or patterns commonly or exclusively included in surnames. The list of known character sets or patterns commonly or exclusively included in surnames can be stored in data storage 114 and normalization manager 120 can communicate with data storage 114 to search the list of known character sets or patterns commonly or exclusively included in surnames.

In some embodiments, normalization manager 120 can determine the confidence score based on whether a string includes a set of characters or patterns indicating that the string is the surname. For example, normalization manager 120 can assign a higher confidence score that a string is a surname upon determining that the string includes a set of characters or patterns indicating that the string is a surname.

Normalization manager 120 can compare the determined confidence score to a threshold confidence score. If the confidence score meets or exceeds a threshold confidence score, normalization module 120 can determine that the first string represents the given name and the second string represents the surname. Alternatively, if the confidence score does not meet or exceed the threshold confidence score, normalization manager 120 can determine that it is uncertain which string is the given name and which string is the surname.

In some embodiments, the threshold confidence score can be based on a reliability level of a data set including the first string and the second string. A data set that has a high reliability level (e.g., data set in a consistent format and/or clean data set) can be trusted more than a data set with a lower reliability level. Accordingly, a higher threshold confidence value can be used for a data set that has a high reliability level, thereby requiring a high level of confidence to rearrange the order of data included in the data set. Alternatively, a lower threshold confidence value can be used for a data set that has a low reliability level, thereby requiring a lower level of confidence to rearrange the order of the data included in the data set Normalization manager 120 can arrange the first string and the second string into a normalized format (e.g., 'surname, given name' or 'given name, surname') based on whether the confidence score meets or exceeds the threshold confidence score. For example, if normalization manager 120 determines that the confidence score meets or exceeds the threshold confidence score, normalization manager 120 can arrange the first string and second string according to the determination that the first string is the given name and the second string is the surname. Alternatively, if the confidence score does not meet or exceed the threshold confidence score, normalization manager 120 can leave the user name arranges as it was received in the data set or, alternatively, remove the user name. The normalized data set can be saved to a file in data storage 114 and/or added to an existing database of normalized user names in data storage 114.

Figure 2:
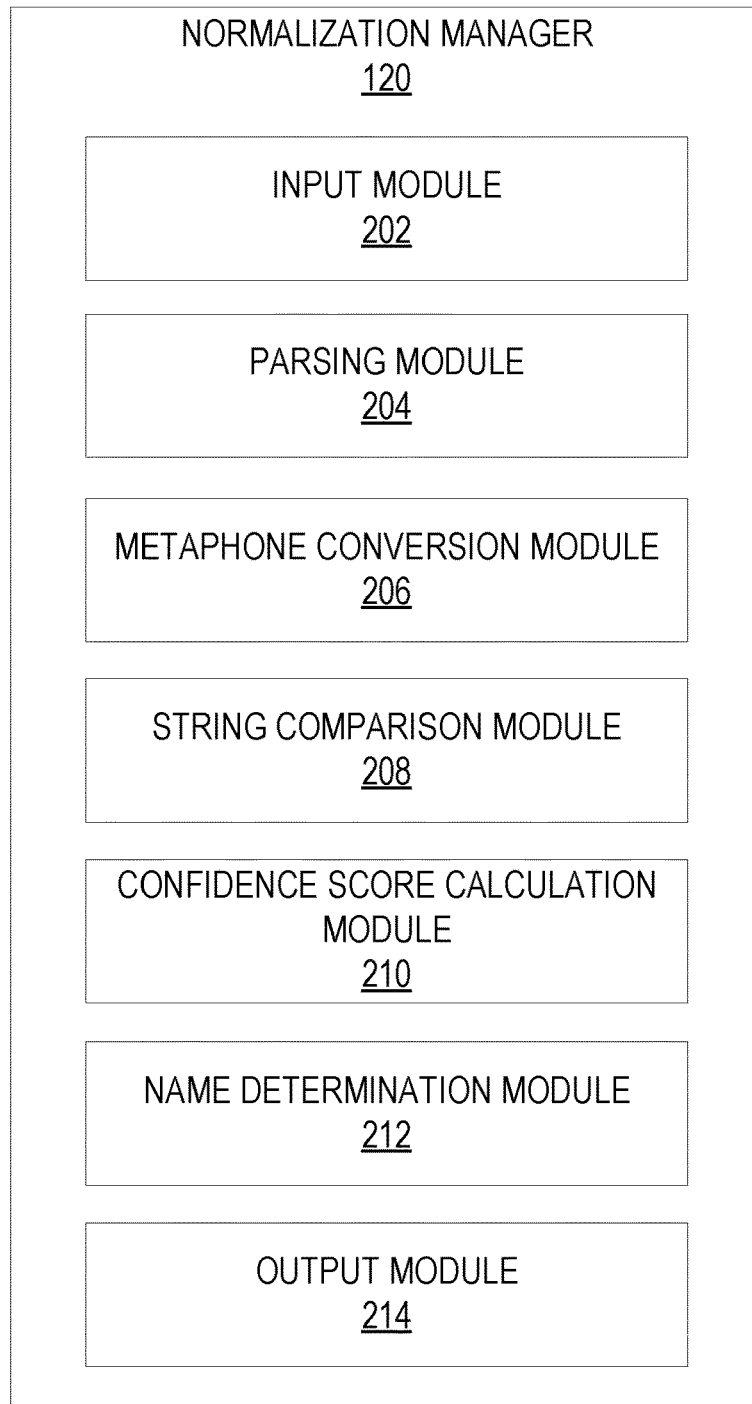
FIG. 2 shows an example block diagram of a normalization manager, according to some example embodiments.

FIG. 2 shows an example block diagram of normalization manger 120. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by normalization manager 120 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, normalization manger 120 includes input module 202, parsing module 204, metaphone conversion module 206, string comparison module 208, confidence score calculation module 210, name determination module 212 and output module 214. Input module 202 can receive a data set of user names. For example, input module 202 can provide client device 104 with a normalization interface that a user of client device 104 can utilize to manually enter user names, upload a data set of user names and/or cause input module 202 to gather a data set of usernames from user name data source 108. Input module 202 can also communicate with user name data source 108 to request and/or pull data sets of usernames.

Parsing module 204 can parse a received data set to identify user names. For example, parsing module 204 can identify spaces, punctuation (e.g., commas, periods, etc.), line returns, etc., that indicate that a string within the data set represents a single user name. Parsing module 204 can repeat this process to identify the set of user names in a received data set.

Parsing module 204 can further parse each identified user name in the data set to remove superfluous characters and/or punctuation. For example, parsing module can remove name prefixes, name suffixes, salutations, punctuation, etc. Parsing module 204 can identify a first string and a second string that represent a user's given name and surname. For example, parsing module 204 can identify spaces, punctuation (e.g., commas, periods, etc.), line returns, etc., that indicate two separate strings within the user name.

Additionally, parsing module 204 can normalize the identified names into a specified format. For example, parsing module 204 can normalize capitalization (e.g., capitalize the first letter of each name) and format of the names to ensure that each is presented in a consistent format. In some embodiments, this can be achieved by identification of name prefix, suffix and conjunctive tokens and matching against rule sets for known token types (hyphenated, prefix, suffix, conjunctive, scottish-mac, irish-apostrophe etc.).

Metaphone conversion module 206 can convert strings into metaphone strings. For example, metaphone conversion module 206 can utilize a metaphone algorithm to covert a string into a metaphone string. Example metaphone algorithms can include the double metaphone phonetic encoding algorithm, metaphone 3 phonetic encoding algorithm, etc.

Metaphone conversion module 206 can convert the first string and second string for each user name identified by parsing module 204 into metaphone strings. For example, parsing module 204 can provide the parsed user name including the first string and the second string to metaphone conversion module 206. Metaphone conversion module 206 can then utilize a metaphone algorithm to convert the first string into a first metaphone string and the second string into a second metaphone string.

String comparison module 208 can search a name index based on the first metaphone string and the second metaphone string for each identified user name. The name index can include a listing of metaphone strings representing common names along with probabilities that each listed common name is either a given name or a surname. For example, each metaphone string listed in the name index can be assigned a probability score (e.g., numerical value) indicating the likelihood that its corresponding metaphone string is either a given name or a surname. String comparison module 208 can search the name index based on the first metaphone string and the second metaphone string to determine whether there is a matching entry in the name index. If a matching entry is found in the name index, string comparison module 208 can retrieve the corresponding probability score for the matching entry.

In some embodiments, the name index can include multiple sets of metaphone strings corresponding to different language sets, nationalities, genders or other contextual information. For example, the name index can include at least a first set of metaphone strings corresponding to a first language set, and a second set of metaphone strings corresponding to a second language set. The metaphone strings in each set of metaphone strings can represent phonetic pronunciations of names based on the corresponding language set.

In this type of embodiment, string comparison module 208 can search one or more sets of the metaphone strings. For example, string comparison module 208 can search each set of metaphone strings. Alternatively, string comparison module 208 can search the set of metaphone strings corresponding to a language set that is most commonly used in a geographic region associated with the data set. For example, string comparison module 208 can search the set of metaphone strings corresponding to English when the data set was received from a source located in the Unites States of America.

In addition to the name index, string comparison module 208 can also search a list of known character sets or patterns commonly or exclusively included in surnames. Certain sets of characters, such as 'Van,' 'Bin,' 'Del,' etc., included in a string can indicate that the string is likely a surname rather than a given name. String comparison module 208 can search a list of known character sets or patterns commonly or exclusively included in surnames based on a user name to determine whether the first string or the second string includes a set of characters indicating that the string is a surname.

In some embodiments, string comparison module 208 can determine whether a name is a name of an organization (e.g., business, government agency, etc.) rather than a name of a human. For example, string comparison module 208 can search a list on known character sets or patterns commonly or exclusively included in organization names. Certain sets of characters or patterns, such as 'industry,' 'system,' 'ltd,' 'plc,' etc., included in a string can indicate that the string is likely a organization name rather than a person's name. String comparison module 208 can search a list of known character sets or patterns commonly or exclusively included in organization names based on a user name to determine whether a string includes a set of characters indicating that the string is an organization name.

In some embodiments, string comparison module 208 can improve accuracy by using additional contextual information, when available. Contextual information can include gender, nationality, date of birth, marital status, married partner, sibling or other family names. String comparison module 208 can use the contextual information to restrict searches to subsets of data. Sets of metaphone strings and/or lists of known characters maintained by data normalization system 106 can be associated with contextual data that describes or categorize the listed metaphone strings and/or lists of know characters. For example, the metadata can describe whether a name is commonly a male or female name, a geographic region where the name is common, etc. String comparison module 208 can use the contextual information describing a data set to select an appropriate subset of metaphone strings and/or known characters to search based on strings identified in the data set. For example, if a string or data set is associated with contextual data indicating that the string is a male name, string comparison module 208 can limit its search to metaphone strings that are male names. As another example, if a string or data set is associated with metadata indicating that the data originates from a specified region, string comparison module 2089 can limit its search to metaphone strings that are associated with the specified region.

Confidence score calculation module 210 can calculate a confidence score for a user name indicating a confidence that it is known which string (e.g., first string or second string), is the given name and which string is the surname. Confidence score calculation module 210 can calculate the confidence score based on a variety of factors and in numerous ways. For example, confidence score calculation module 210 can calculate the confidence score based on the probability scores and whether either string includes a set of characters indicating that the string is a surname. For example, if the first metaphone string matches a metaphone string in the name index with a high probability score of being a given name and the second metaphone string matches a metaphone string in the name index with a high probability score of being a surname, confidence score calculation module 210 can assign a high confidence score that the first string represents the given name and the second string represents the surname. Alternatively, if the first and/or second metaphone strings do not match any entries in the name listing or match listings assigned with lower probabilities scores of being a given name or surname, confidence score calculation module 210 can assign a lower confidence score that the first string represents the given name and the second string represents the surname.

Confidence score calculation module 210 can assign a higher confidence score when a string includes a set of characters indicating that the string is a surname. For example, if string comparison module 208 determines that the second string includes a set of characters indicating that the second string is a surname, confidence score calculation module 210 can assign a high confidence score that the first string represents the given name and the second string represents the surname. Alternatively, if string comparison module 208 determines that the first string includes a set of characters indicating that the first string is a surname, confidence score calculation module 210 can assign a high confidence score that the second string represents the given name and the first string represents the surname.

Name determination module 212 can determine whether the given name and surname can be confidently ascertained from the above described analysis. Name determination module 212 can compare the determined confidence score to a threshold confidence score indicating a confidence level at which the given name and surname can be confidentially ascertained. If the confidence score meets or exceeds a threshold confidence score, name determination module 212 can determine that the determined given name and surname can be trusted. Alternatively, if the confidence score does not meet or exceed the threshold confidence score, name determination module 212 can determine that it is uncertain which string is the given name and which string is the surname.

In some embodiments, the threshold confidence score can be based on a reliability level of a data set including the first string and the second string. A data set that has a high reliability level (e.g., data set in a consistent format and/or clean data set) can be trusted more than a data set with a lower reliability level. Accordingly, a higher threshold confidence value can be used for a data set that has a high reliability level, thereby requiring a high level of confidence to rearrange the order of data included in the data set. Alternatively, a lower threshold confidence value can be used for a data set that has a low reliability level, thereby requiring a lower level of confidence to rearrange the order of the data included in the data set Output module 212 can arrange the first string and the second string for each user name into a normalized format (e.g., 'surname, given name' or 'given name, surname') based on whether the confidence score meets or exceeds the threshold confidence score. For example, if name determination module 212 determines that the confidence score meets or exceeds the threshold confidence score, output module 212 can arrange the first string and second string according to the determination regarding which string is the given name and the which string is the surname. Alternatively, if the confidence score does not meet or exceed the threshold confidence score, output module 212 can leave the user name arranged as it was receive in the data set or, alternatively, remove the user name from the data set. Output module 212 can save the normalized data set as a separate file and/or add the normalized data set to an existing database of normalized user names.

Figure 3:
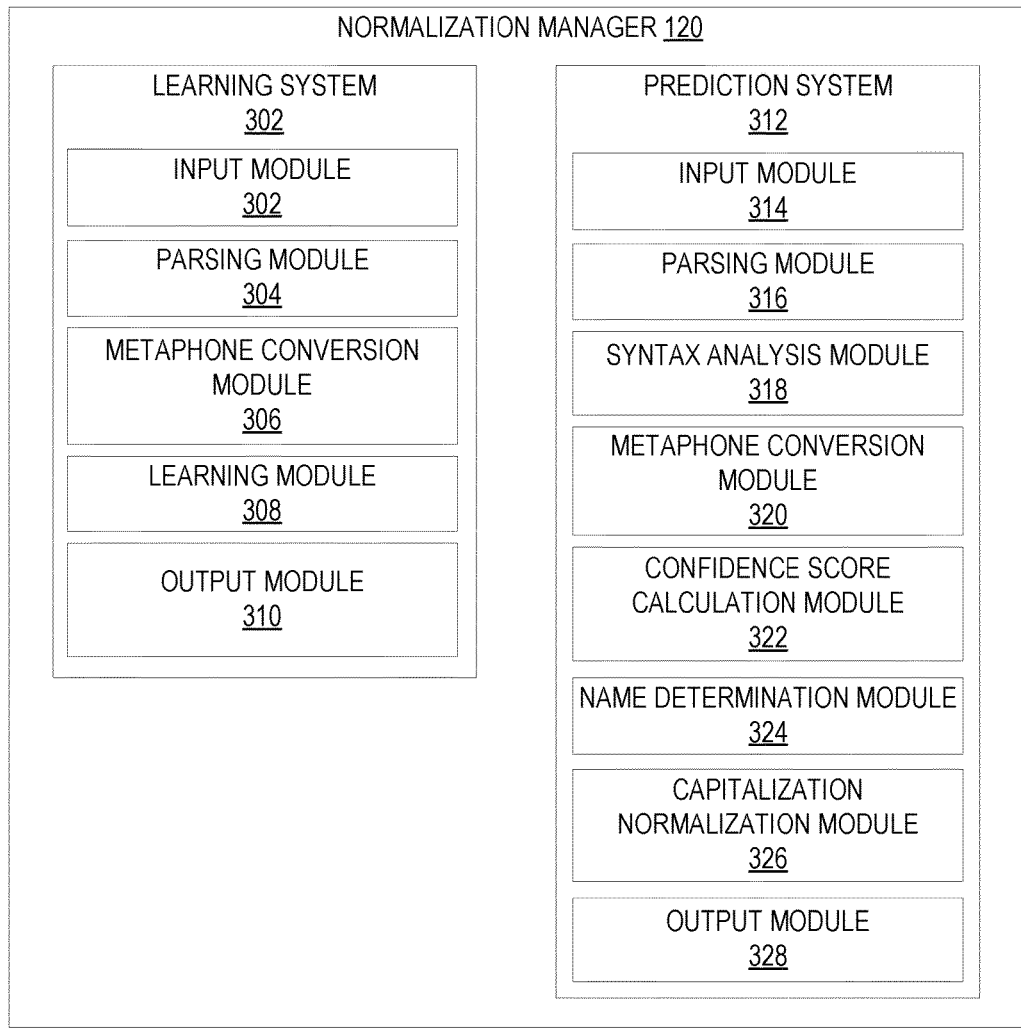
FIG. 3 shows another example block diagram of a normalization manager, according to some example embodiments.

FIG. 3 shows another example block diagram of a normalization manager, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by normalization manager 120 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, normalization manger 120 includes learning system 302 and prediction system 312. Learning system 302 can be configured to analyze and learn from data sets of known usernames. As shown, learning system 302 includes input module 302 configured to receive a data set of known user names. The data setoff known user names can be received from any type of data source, such as a user name data source 108. The data set of known user names can be a set of data including one or more user names that have a known order, meaning that the order of the given name the surname known.

Parsing module 304 can parse the data set of known user names to identify and normalize individual user names. This can include identifying the given and surname based on the order in which they are listed in the data set of know user names, as well as removing prefixes, punctuation, suffixes, middle names, middle initials, etc. Metaphone conversion module 306 can then convert the parsed user names into metaphone strings.

Learning module 308 can analyse the resulting set of metaphone strings to determine the commonality of the listed names as either a given name or surname, as well as assign probabilities that each listed name is a given name or surname. Learning module 308 can further analyse the metaphone strings for sets or characters or patterns that indicate that a string is either a given name or a surname.

Output module 310 can generate a name index and/or a list of know characters or sets of patterns indicating that a name is a surname based on the analysis performed by learning module 308. Output module 310 can store the resulting name index and/or list of known character sets for later use by prediction system 312 to normalize data sets of user names. For example, output module 310 can store the name index and/or list of known character sets in data storage 114. Alternatively, output module 310 can provide the name index and/or list of known character sets directly to prediction system 312.

Prediction system 312 can be configured to normalize data sets of user names. For example, input module 314 can receive a data set from a user name data source. Parsing module 314 can parse a received data set to identify user names. For example, parsing module 314 can identify spaces, punctuation (e.g., commas, periods, etc.), line returns, etc., that indicate that a string within the data set represents a single user name. Parsing module 314 can repeat this process to identify the set of user names in a received data set.

Parsing module 314 can further parse each identified user name in the data set to remove superfluous characters and/or punctuation. For example, parsing module can remove name prefixes, name suffixes, salutations, punctuation, etc. Parsing module 314 can identify a first string and a second string that represent a user's given name and surname. For example, parsing module 314 can identify spaces, punctuation (e.g., commas, periods, etc.), line returns, etc., that indicate two separate strings within the user name.

Syntax analysis module 318 can analyse each string to determine whether the string includes sets of characters or patterns indicating that a string is either a given name or surname. For example, syntax module 318 can access, from data storage 114, lists of known character sets or patters indicating that a name is a given name or surname, and then search the accessed lists for matches.

Metaphone conversion module 320 can convert parsed strings from a data set into metaphone strings. For example, metaphone conversion module 206 can utilize a metaphone algorithm to covert a string into a metaphone string. Example metaphone algorithms can include the double metaphone phonetic encoding algorithm, metaphone 3 phonetic encoding algorithm, etc.

Confidence score calculation module 322 can calculate a confidence score for a user name indicating a confidence that it is known which string (e.g., first string or second string), is the given name and which string is the surname. For example, the confidence score can indicate a confidence level that the user name is listed in a correct order or, alternatively, the strings in the user name should be swapped.

Confidence score calculation module 322 can calculate the confidence score based on a variety of factors and in numerous ways. For example, if the name order can confidently be determined by syntax rules (e.g., the name includes sets of characters or patterns indicating that a string is a surname), then this factor alone can be used to determine the order. Accordingly, confidence score calculation module 322 can assign a high confidence score in this type of situation.

Alternatively, if the order of the user name cannot be determined based on the syntax rules alone, confidence score calculation module 322 can assign a confidence score based on a determined signal strength assigned to each string indicating the likelihood that the string is either a given name or a surname. The signal strength can be calculated utilizing the name index of metaphone strings.

Confidence score calculation module 322 can determine a signal strength in numerous ways. For example, in some embodiments, confidence score calculation module 322 can search the name index based on a metaphone string to determine the probability score that the corresponding string is a given name and the probability score that the string is a surname.

Confidence score calculation module 322 can utilize the probability scores to calculate a signal strength indicating that a string is a given name and a signal strength indicating that the string is a surname. For example, to determine the signal strength that a string is a given name, confidence score calculation module 322 can divide the probability score that the string is a given name by the probability score that the string is a surname. This process can be performed in the opposite order (i.e., probability score that the string is a surname name divided by the probability score that the string is a given name) to determined the signal strength that the string is a surname. This process can be performed on both strings included in a user name.

Confidence score calculation module 322 can then determine an absolute signal difference for both strings. The absolute signal difference for a string can be determined by determining the absolute difference between the signal strength that the string is a given name and the signal strength that the string is a surname. Confidence score calculation module 322 can then determine the confidence score based on the resulting absolute signal differences for the two strings. For example, confidence score calculation module 322 can base the confidence score in the higher absolute signal difference.

Name determination module 324 can determine the order of the user name based on the confidence score. For example, name determination module 324 can compare the confidence score to a threshold confidence score. If the confidence score exceeds the threshold confidence score, name determination module 324 can order the strings based on the determined order. Alternatively, if the confidence score does not exceed the threshold confidence score, name normalization module 324 can return the user name in the order in which it was received or, alternatively, return null. Capitalization normalization module 326 can normalize the strings to correct capitalization and/or exclude middle names.

Output module 328 can output the resulting normalized data set For example, output module 328 can cause presentation of the normalized data set on a display of a user's client device 104, save the normalized data set as a separate file and/or add the normalized data set to an existing database of normalized user names.

Example name normalization output resulting from show input are listed below.

John Smith→[John Smith]
john a smith→[John Smith]
Mr. John Smith→[John Smith]
mr. john a. smith→[John Smith]
Mr. John Smith snr.→[John Smith Snr.]
mr john SMITH→[John Smith]
Smith, john (Mr)→[John Smith]
mr John Andrew Smith→[John Smith]
Smith John Andrew→[John Smith]
john. ![SM:ITH]!→[John Smith]
Smith john→[John Smith]
smith, john A→[John Smith]
frank martin→[Fail due to lack of confidence]
martin frank→[Fail due to lack of confidence]
John Smith ltd→[This is an organization name]
von neumann john→[John von Neumann]
john von neumann→[John von Neumann]
john V neumann→[John Neumann]
john neumann V→[John Neumann V]
von Neumann V john→[John von Neumann V]
von Neumann V john W→[John von Neumann V]

FIG. 4 shows an example method for normalizing data including user names, according to some example embodiments. Method 400 may be embodied in computer readable instructions for execution by one or more processors such that the operations of method 400 may be performed in part or in whole by normalization manager 120; accordingly, method 400 is described below by way of example with reference thereto. However, it shall be appreciated that at least some of the operations of method 400 may be deployed on various other hardware configurations and method 400 is not intended to be limited to normalization manager 120.

At operation 402, metaphone conversion module 206 converts, using a metaphone algorithm, a first string into a first metaphone string, and a second string into a second metaphone string. The first metaphone string and the second metaphone string can each be a part of a user name.

At operation 404, string comparison module 208 searches, based on the first metaphone string and the second metaphone string, a name index including a listing of metaphone strings representing common names and probabilities that the common names are either a given name or a surname. For example, string comparison module 208 can search the name index for metaphone string entries that match the first metaphone string and the second metaphone string.

In some embodiments, the name index includes at least a first set of metaphone strings corresponding to a first language set, and a second set of metaphone strings corresponding to a second language set. In some embodiments, a metaphone string from the first set of metaphone strings and a metaphone string from the second set of metaphone strings both represent the same name. String comparison module 208 can search one or both of the first set of metaphone strings and the second set of metaphone strings.

At operation 406, confidence score calculation module 210 determines, based on searching the name index, a confidence score indicating a confidence level that the first string represents the given name and the second string represents the surname. In some embodiments, confidence score calculation module 210 can further determine the confidence score based on determining that the second string includes a set of characters indicating that the second string is the surname.

At operation 408, name determination module 212 determines that the confidence score meets or exceeds a threshold confidence score. In some embodiments, the threshold confidence score is based on a reliability level of a data set including the first string and the second string. In response to determining that the confidence score meets or exceeds the threshold confidence score, name determination module 212 determines that the first string represents the given name and the second string represents the surname.

Figure 5:
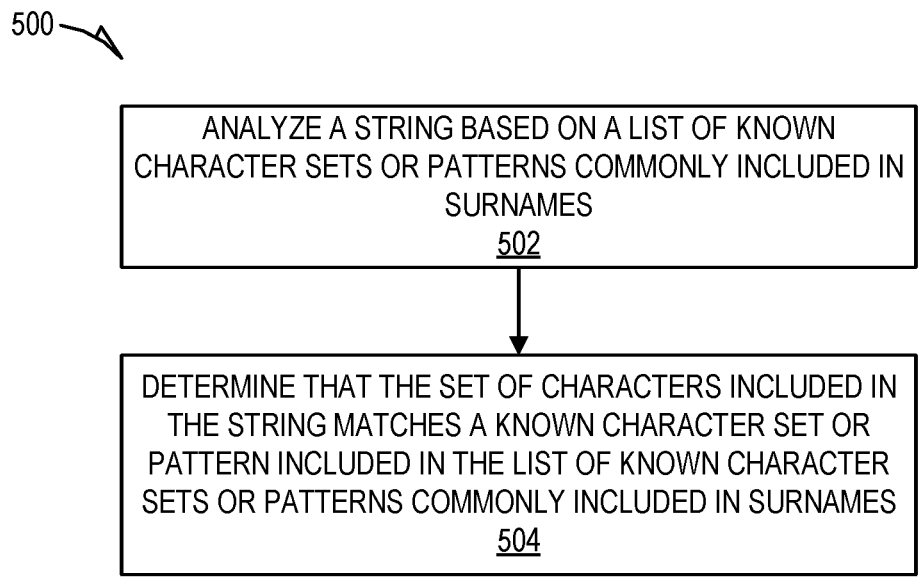
FIG. 5 shows an example method for determining that a string includes a set of characters indicating that the string is a surname, according to some example embodiments.

FIG. 5 shows an example method for determining that a string includes a set of characters indicating that the string is a surname, according to some example embodiments. Method 500 may be performed in conjunction with method 400 of FIG. 4. Method 500 may be embodied in computer readable instructions for execution by one or more processors such that the operations of method 500 may be performed in part or in whole by normalization manager 120; accordingly, method 400 is described below by way of example with reference thereto. However, it shall be appreciated that at least some of the operations of method 500 may be deployed on various other hardware configurations and method 500 is not intended to be limited to normalization manager 120.

At operation 502, string comparison module 208 analyzing a string based on a list of known character sets or patterns commonly or exclusively included in surnames.

At operation 504, string comparison module 208 determines that the set of characters included in the string matches a known character set included in the list of known character sets or patterns commonly or exclusively included in surnames.

Figure 6:
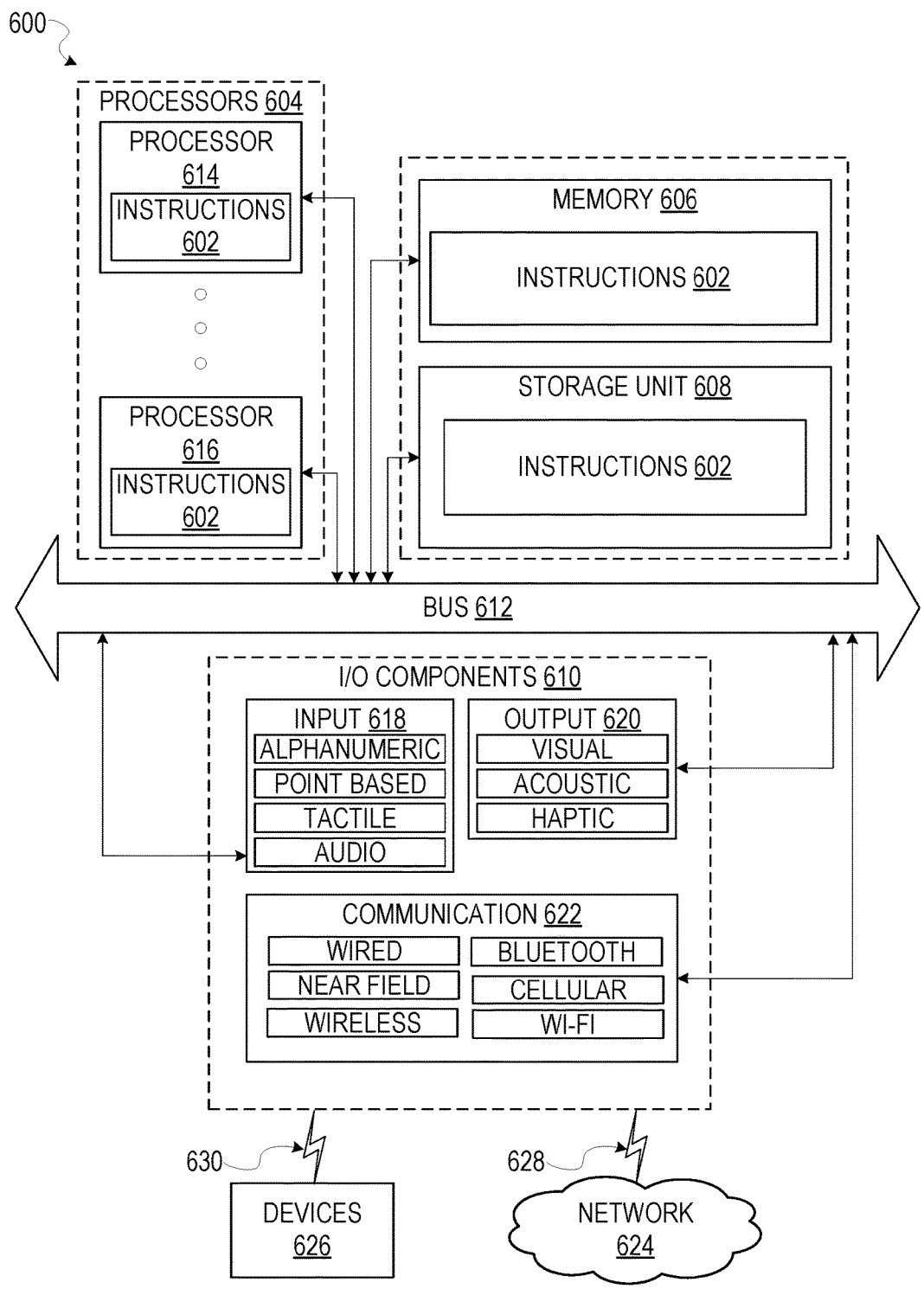
FIG. 6 shows a diagrammatic representation of a computing device in the example form of a computer system within which a set of instructions for causing the computing device to perform any one or more of the methodologies discussed herein may be executed.

FIG. 6 shows a block diagram illustrating components of a computing device 600, according to some example embodiments, able to read instructions from a machine-readable medium (e.g., a machine-readable storage medium) and perform any one or more of the methodologies discussed herein. Specifically, FIG. 6 shows a diagrammatic representation of computing device 600 in the example form of a system, within which instructions 602 (e.g., software, a program, an application, an applet, an app, a driver, or other executable code) for causing computing device 600 to perform any one or more of the methodologies discussed herein may be executed. For example, instructions 602 include executable code that causes computing device 600 to execute method 400 and 500. In this way, these instructions transform the general, non-programmed machine into a particular machine programmed to carry out the described and illustrated functions in the manner described herein. Computing device 600 may operate as a standalone device or may be coupled (e.g., networked) to other machines.

By way of non-limiting example, computing device 600 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing instructions 602, sequentially or otherwise, that specify actions to be taken by computing device 600. Further, while only a single computing device 600 is illustrated, the term "machine" shall also be taken to include a collection of computing devices 600 that individually or jointly execute instructions 602 to perform any one or more of the methodologies discussed herein.

Computing device 600 may include processors 604, memory 606, storage unit 608 and I/O components 610, which may be configured to communicate with each other such as via bus 612. In an example embodiment, processors 604 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 614 and processor 616 that may execute instructions 602. The term "processor" is intended to include multi-core processors that may comprise two or more independent processors (sometimes referred to as "cores") that may execute instructions contemporaneously. Although FIG. 6 shows multiple processors, computing device 600 may include a single processor with a single core, a single processor with multiple cores (e.g., a multi-core process), multiple processors with a single core, multiple processors with multiples cores, or any combination thereof.

Memory 606 (e.g., a main memory or other memory storage) and storage unit 608 are both accessible to processors 604 such as via bus 612. Memory 606 and storage unit 608 store instructions 602 embodying any one or more of the methodologies or functions described herein. In some embodiments, database 616 resides on storage unit 608. Instructions 602 may also reside, completely or partially, within memory 606, within storage unit 608, within at least one of processors 604 (e.g., within the processor's cache memory), or any suitable combination thereof, during execution thereof by computing device 600. Accordingly, memory 606, storage unit 608, and the memory of processors 604 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 602. The term "machine-readable medium" shall also be taken to include any medium, or combination of multiple media, that is capable of storing instructions (e.g., instructions 602) for execution by a machine (e.g., computing device 600), such that the instructions, when executed by one or more processors of computing device 600 (e.g., processors 604), cause computing device 600 to perform any one or more of the methodologies described herein (e.g., method 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 610 may include a wide variety of components to receive input, provide output, produce output, transmit information, exchange information, capture measurements, and so on. The specific I/O components 610 that are included in a particular machine will depend on the type of machine. For example, portable machines such as mobile phones will likely include a touch input device or other such input mechanisms, while a headless server machine will likely not include such a touch input device. It will be appreciated that I/O components 610 may include many other components that are not specifically shown in FIG. 6. I/O components 610 are grouped according to functionality merely for simplifying the following discussion and the grouping is in no way limiting. In various example embodiments, I/O components 610 may include input components 618 and output components 620. Input components 618 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. Output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 610 may include communication components 622 operable to couple computing device 600 to network 624 or devices 626 via coupling 628 and coupling 630, respectively. For example, communication components 622 may include a network interface component or other suitable device to interface with network 624. In further examples, communication components 622 may include wired communication components, wireless communication components, cellular communication components, near field communication (NFC) components, Bluetooth® components (e.g., Bluetooth® Low Energy), WiFi® components, and other communication components to provide communication via other modalities. The devices 626 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A data normalization system comprising:
   one or more computer processors; and
   one or more computer-readable mediums storing instructions that, when executed by the one or more computer processors, causes the data normalization system to perform operations comprising:
      receiving a first string and a second string, the first string and the second string being ordered according to an initial string ordering;
      converting, using a metaphone algorithm, the first string into a first metaphone string, and the second string into a second metaphone string;
      searching, based on the first metaphone string and the second metaphone string, a name index including a listing of metaphone strings representing common names and probabilities that the common names are either a given name or a surname;
      determining, based on searching the name index, a confidence score indicating a confidence level that the first string represents the given name and that the second string represents the surname;
      determining that the confidence score does not meet or exceed a threshold confidence score;
      in response to determining that the confidence score does not meet or exceed the threshold confidence score, analyzing, the first string and the second string based on a list of known character sets included in surnames, yielding an analysis;
      determining, based on the analysis, that a set of characters in the second string matches a known character set included in the list of known character sets included in surnames; and
      in response to determining that the set of characters in the second string matches a known character set included in the list of known character sets included in surname, ordering the first string and the second string according to an updated string ordering.

2. The data normalization system of claim 1, the operations further comprising:
   calculating an updated confidence score based on the analysis; and
   determining that the updated confidence score meets or exceeds the threshold confidence score.

3. The data normalization system of claim 1, the operations further comprising:
   determining, based on searching the name index, a signal strength that the first metaphone string is a given name, a signal strength that the first metaphone string is a surname, a signal strength that the second metaphone string is a given name, and a signal strength that the second metaphone string is a surname;
   determining an absolute difference between the signal strength that the first metaphone string is a surname and the signal strength that the first metaphone string is a given name, yielding an absolute signal difference for the first string;

determining an absolute difference between the signal strength that the second metaphone string is a surname and the signal strength that the second metaphone string is a given name, yielding an absolute signal difference for the second string; and determining that the absolute signal difference for the first string is greater than the absolute signal difference for the second string.

4. The data normalization system of claim 3, wherein the confidence score is further based on determining that the absolute signal difference for the first string is greater than the absolute signal difference for the second string.

5. The data normalization system of claim 1 wherein the name index includes at least a first set of metaphone strings corresponding to a first language set, and a second set of metaphone strings corresponding to a second language set.

6. The data normalization system of claim 5, wherein a metaphone string from the first set of metaphone strings and a metaphone string from the second set of metaphone strings both represent an identical name.

7. A method comprising:
receiving a first string and a second string, the first string and the second string being ordered according to an initial string ordering;
converting, using a metaphone algorithm, the first string into a first metaphone string, and the second string into a second metaphone string;
searching, based on the first metaphone string and the second metaphone string, a name index including a listing of metaphone strings representing common names and probabilities that the common names are either a given name or a surname;
determining, based on searching the name index, a confidence score indicating a confidence level that the first string represents the given name and that the second string represents the surname;
determining that the confidence score does not meet or exceed a threshold confidence score;
in response to determining that the confidence score does not meet or exceed the threshold confidence score, analyzing, the first string and the second string based on a list of known character sets included in surnames, yielding an analysis;
determining, based on the analysis, that a set of characters in the second string matches a known character set included in the list of known character sets included in surnames; and
in response to determining that the set of characters in the second string matches a known character set included in the list of known character sets included in surname, ordering the first string and the second string according to an updated string ordering.

8. The method of claim 7, further comprising:
calculating an updated confidence score based on the analysis; and
determining that the updated confidence score meets or exceeds the threshold confidence score.

9. The method of claim 7, further comprising:
determining, based on searching the name index, a signal strength that the first metaphone string is a given name, a signal strength that the first metaphone string is a surname, a signal strength that the second metaphone string is a given name, and a signal strength that the second metaphone string is a surname;

determining an absolute difference between the signal strength that the first metaphone string is a surname and the signal strength that the first metaphone string is a given name, yielding an absolute signal difference for the first string;

determining an absolute difference between the signal strength that the second metaphone string is a surname and the signal strength that the second metaphone string is a given name, yielding an absolute signal difference for the second string; and determining that the absolute signal difference for the first string is greater than the absolute signal difference for the second string.

10. The method of claim 9, wherein the confidence score is further based on determining that the absolute signal difference for the first string is greater than the absolute signal difference for the second string.

11. The method of claim 7, wherein the name index includes at least a first set of metaphone strings corresponding to a first language set, and a second set of metaphone strings corresponding to a second language set.

12. The method of claim 11, wherein a metaphone string from the first set of metaphone strings and a metaphone string from the second set of metaphone strings both represent an identical name.

13. A non-transitory computer-readable medium storing instructions that, when executed by one or more computer processors of a data normalization system, causes the data normalization system to perform operations comprising:
receiving a first string and a second string, the first string and the second string being ordered according to an initial string ordering;
converting, using a metaphone algorithm, the first string into a first metaphone string, and the second string into a second metaphone string;
searching, based on the first metaphone string and the second metaphone string, a name index including a listing of metaphone strings representing common names and probabilities that the common names are either a given name or a surname;
determining, based on searching the name index, a confidence score indicating a confidence level that the first string represents the given name and that the second string represents the surname;
determining that the confidence score does not meet or exceed a threshold confidence score;
in response to determining that the confidence score does not meet or exceed the threshold confidence score, analyzing, the first string and the second string based on a list of known character sets included in surnames, yielding an analysis;
determining, based on the analysis, that a set of characters in the second string matches a known character set included in the list of known character sets included in surnames; and
in response to determining that the set of characters in the second string matches a known character set included in the list of known character sets included in surname, ordering the first string and the second string according to an updated string ordering.

14. The non-transitory computer-readable medium of claim 13, the operations further comprising:
calculating an updated confidence score based on the analysis; and
determining that the updated confidence score meets or exceeds the threshold confidence score.

15. The non-transitory computer-readable medium of claim 13, the operations further comprising:
- determining, based on searching the name index, a signal strength that the first metaphone string is a given name, a signal strength that the first metaphone string is a surname, a signal strength that the second metaphone string is a given name, and a signal strength that the second metaphone string is a surname;
- determining an absolute difference between the signal strength that the first metaphone string is a surname and the signal strength that the first metaphone string is a given name, yielding an absolute signal difference for the first string;
- determining an absolute difference between the signal strength that the second metaphone string is a surname and the signal strength that the second metaphone string is a given name, yielding an absolute signal difference for the second string; and
- determining that the absolute signal difference for the first string is greater than the absolute signal difference for the second string.

16. The non-transitory computer-readable medium of claim 15, wherein the confidence score is further based on determining that the absolute signal difference for the first string is greater than the absolute signal difference for the second string.

17. The non-transitory computer-readable medium of claim 13, wherein the name index includes at least a first set of metaphone strings corresponding to a first language set, and a second set of metaphone strings corresponding to a second language set, and a metaphone string from the first set of metaphone strings and a metaphone string from the second set of metaphone strings both represent an identical name.

* * * * *